US012240505B2

(12) United States Patent
Bron et al.

(10) Patent No.: US 12,240,505 B2
(45) Date of Patent: Mar. 4, 2025

(54) LOW MAINTENANCE RAIL MONITORING PROBE

(71) Applicant: SCANMASTER SYSTEMS (IRT) LTD., Kfar Saba (IL)

(72) Inventors: Michael Bron, Petach Tikva (IL); Slava Sigalov, Ramat Gan (IL); Rostislav Friedman, Haifa (IL)

(73) Assignee: SCANMASTER SYSTEMS (IRT) LTD., Kfar Saba (IL)

( * ) Notice: Subject to any disclaimer, the term of this patent is extended or adjusted under 35 U.S.C. 154(b) by 502 days.

(21) Appl. No.: 17/429,747

(22) PCT Filed: Feb. 10, 2019

(86) PCT No.: PCT/IL2019/050160
§ 371 (c)(1),
(2) Date: Aug. 10, 2021

(87) PCT Pub. No.: WO2020/161691
PCT Pub. Date: Aug. 13, 2020

(65) Prior Publication Data
US 2022/0097739 A1 Mar. 31, 2022

(51) Int. Cl.
*B61K 9/08* (2006.01)
*B61L 23/04* (2006.01)
(Continued)

(52) U.S. Cl.
CPC ............. *B61K 9/08* (2013.01); *B61L 23/045* (2013.01); *G01N 29/043* (2013.01);
(Continued)

(58) Field of Classification Search
CPC ....... B61K 9/08; B61L 23/045; G01N 29/043; G01N 29/225; G01N 29/265; G01N 29/28; G01N 2291/2623
(Continued)

(56) References Cited

U.S. PATENT DOCUMENTS 1,998,952 A * 4/1935 Edgar ...................... B61K 9/10
33/300
3,213,359 A * 10/1965 Freytag .................. H10N 52/00
(Continued)

FOREIGN PATENT DOCUMENTS

CA    2732971 A1 * 8/2012 ............... B61K 9/08
EP    2347941 A1 * 7/2011 ............... B61K 9/10
(Continued)

OTHER PUBLICATIONS

McVey et al., Track Modulus Measurement From a Moving Railcar, College of Engineering and Technology University of Nebraska—Lincoln, 2005, 33 pgs (Year: 2005).*
(Continued)

*Primary Examiner* — Stephanie E Bloss
*Assistant Examiner* — Kevin C Butler
(74) *Attorney, Agent, or Firm* — The Roy Gross Law Firm, LLC; Roy Gross

(57) ABSTRACT

An ultrasonic probe for non-destructive testing of a rail, said probe comprising a housing; an insert comprising an ultrasonic transducer and a polycarbonate shoe having a face for contacting a rail; and a compressed spring for exerting a downward force on said insert; the system further comprising a plate with a restraining flange around an aperture to prevent the polycarbonate shoe from extending more than a preset fixed amount through the aperture.

5 Claims, 5 Drawing Sheets

(51) Int. Cl.
*G01N 29/04* (2006.01)
*G01N 29/22* (2006.01)
*G01N 29/265* (2006.01)
*G01N 29/28* (2006.01)

(52) U.S. Cl.
CPC ......... *G01N 29/225* (2013.01); *G01N 29/265* (2013.01); *G01N 29/28* (2013.01); *G01N 2291/2623* (2013.01)

(58) Field of Classification Search
USPC .......................................................... 73/618
See application file for complete search history.

(56) References Cited

U.S. PATENT DOCUMENTS

| | | | | | |
|---|---|---|---|---|---|
| 4,044,594 | A | * | 8/1977 | Owens | G01N 29/265 73/636 |
| 4,165,648 | A | * | 8/1979 | Pagano | G01N 29/2493 73/639 |
| 5,522,265 | A | * | 6/1996 | Jaeggi | G01N 29/265 73/431 |
| 5,804,731 | A | * | 9/1998 | Jaeggi | G01N 29/28 73/620 |
| 6,070,466 | A | * | 6/2000 | Taran | G01B 17/025 73/620 |
| 6,324,912 | B1 | * | 12/2001 | Wooh | G01N 29/2418 73/629 |
| 6,549,005 | B1 | * | 4/2003 | Hay | B61K 9/10 324/225 |
| 7,521,917 | B2 | * | 4/2009 | Katragadda | B61K 9/10 324/228 |
| 10,989,692 | B2 | * | 4/2021 | English | G01N 23/16 |
| 11,161,531 | B2 | * | 11/2021 | Sela | G01N 29/265 |
| 2002/0065610 | A1 | * | 5/2002 | Clark | B61D 15/00 702/35 |
| 2009/0282923 | A1 | * | 11/2009 | Havira | G01N 29/28 73/636 |
| 2012/0218868 | A1 | * | 8/2012 | Kahn | G01N 29/265 367/99 |
| 2016/0282314 | A1 | * | 9/2016 | Hupkau | B61L 23/002 |
| 2021/0293758 | A1 | * | 9/2021 | Kocur | B61K 9/10 |
| 2022/0097739 | A1 | * | 3/2022 | Bron | G01N 29/225 |

FOREIGN PATENT DOCUMENTS

| | | | | |
|---|---|---|---|---|
| EP | 2277037 B1 | * | 2/2013 | ............... B61K 9/10 |
| FR | 2635066 A1 | | 2/1990 | |
| WO | WO-2016207880 A1 | * | 12/2016 | ............... B61K 9/10 |

OTHER PUBLICATIONS

Heckel et al., High Speed Non-Destructive Rail Testing with Advanced Ultrasoun and Eddy-Current Testing Techniques, Federal Institute for Materials Research and—testing, Jan. 2009, 11 pg(s) (Year: 2009).*

Falamarzi et al., A Review on Existing Sensors and Devices for Inspecting Railway Infrastructure, Civil and Infrastructure Engineering Discipline, School of Engineering, RMIT University, Australia, Jan. 10, 2019, 10 pg(s) (Year: 2019).*

Heckel, Thomas & Thomas, Hans-Martin & Kreutzbruck, Marc & Ruhe, Sven. (2009). High Speed Non-Destructive Rail Testing with Advanced Ultrasound and Eddy-Current Testing Techniques.

Heckel, T. (2009). High Speed Non-Destructive Rail Testing with Advanced Ultrasound and Eddy-Current Testing Techniques [Slide show]. NDT in Progress, 5th International Workshop of NDT Experts, Oct. 12-14, 2009, Prague. NDT.

Tvemavideo. (Jun. 16, 2016). Beijing Metro Railway LAB Ultrasonic test TVEMA 70 (English) [Video]. YouTube. https://www.youtube.com/watch?v=Z1Z9rFOOuYo.

PCT International Search Report for International Application No. PCT/IL2019/050160, mailed Jun. 11, 2019, 4pp.

PCT Written Opinion for International Application No. PCT/IL2019/050160, mailed Jun. 11, 2019, 5pp.

PCT International Preliminary Report on Patentability for International Application No. PCT/IL2019/050160, 11pp.

* cited by examiner

LOW MAINTENANCE RAIL MONITORING PROBE

CROSS REFRENCE TO RELATED APPLICATIONS

This application is a National Phase of PCT Patent Application No. PCT/IL2019/050160 having International filing date of Feb. 10, 2019, the contents of which is all incorporated herein by reference in their entirety.

BACKGROUND

Defects or flaws in rails are a source of concern in the railways industry. Such flaws may be artifacts of the manufacturing processes or they may subsequently develop during use through fatigue processes and the like. Depending on its size and their location within the rail profile, a flaw may be categorized as critical or as non-critical.

A railway track with flaws may be used by trains carrying passengers and freight as long as the sizes of all flaws in the rails remain below a critical size. However, as non-critical flaws may grow in time into critical defects, and as new flaws may appear over time, the inspection of railway tracks for defects should be performed periodically, and where necessary, detected flaws should be repaired or sections of the railway track should be replaced.

To detect flaws in the rails, different nondestructive inspection methods are deployed. One popular technique is ultrasonic testing. A wagon carrying appropriate rail inspection apparatus is towed along the railroad (track), and ultrasonic transducers are kept in sonic contact with the upper surface of each rail. Ultrasonic signals are reflected by the surface of the track and by defects, and so detected variations in the reflected signals may be analyzed and the defects characterized. Such an apparatus can continuously perform ultrasonic inspection of the rails as the wagon passes over them.

It is a feature of such ultrasound systems that the ultrasonic waves require a transmission medium to couple the ultrasound sensor with the track. This may be a polymer or a coupling fluid such as water.

US Pat. No. 4,044,594 discloses a rail testing device by means of only one transducer located in a wheel, which necessitates a complex regulating system to correct the lateral and angular variations of the wheel resulting from irregularities of the rail surface. One known disadvantage of this approach is that such a device cannot work reliably at relatively high speeds.

Some ultrasonic testing solutions use a sled or shoe that slides along the rail. In an inspection apparatus of the sled type, ultrasonic transducers are mounted in transducers housings that are carried on a sled that slides along the rail. Typically two such sleds are employed, one on each rail. For example, published European patent application No. EP 016591 describes a method and device for testing a rail by a means of ultrasonic transducers sliding on the rail while maintaining sonic contact using a coupling fluid that is typically water. The intensity of the signal received by at least one of the transducers is controlled by the intensity variations of the ultrasonic beam reflected by the lower surface of the sole of the rail.

It will be appreciated that the geometric position of the track is never perfect and defective alignment can cause misinterpretation of the signals. The discontinuities between sections of rails cause the sled to swing or jump and acoustic connection is lost. The higher the speed of the train, the more serious the perturbation and this limits the speed at which ultrasonic testing may be accomplished. Installations such as points, where tracks branch and trains can be diverted to side tracks can subject the probes to high forces and have even been known to detach the probe from the measuring wagon.

To fully characterize a rail, perhaps a dozen ultrasonic transducers are required. When arranged in a line along a support beam, the length of the support beam may be considerable. This makes it impossible to ensure ultrasonic contact at speed and adversely affects the speed of the measurement. Another problem is debris on the rail which may damage the ultrasonic transducers.

Attempts to overcome these problems include having the sensors sprung mounted in sockets such that a spring pushes each sensor against the track and if the sensor travels over debris protruding from the track, the sensor can retract into its socket, compressing the spring, thereby avoiding damage to the sensor which is repositioned by the spring once the debris has passed.

U.S. Pat. No. 4,165,648 titled "Two wheel ultrasonic rail testing system and method " describes a system and method for performing ultrasonic inspection of a length of test material with ultrasonic transducing means emitting a beam of ultrasonic energy from within sealed wheel means containing a coupling fluid therein and having a flexible cylindrical surface member transparent to the ultrasonic beam and arranged for rolling contact along the test material. The system and method are characterized by spaced leading and trailing wheel means arranged for rolling contact along the length of test material. Ultrasonic transducer means in each of the leading and trailing wheel means are oriented so that a beam of ultrasonic energy emitted from the transducer means in one wheel means will enter the test material, be reflected from the bottom surface thereof, and be directed to and received by the transducer means in the other wheel means. Each wheel means further includes ultrasonic transducers emitting ultrasonic energy longitudinally in front of and behind the two wheels, and side-looking transducer means for emitting ultrasonic energy into the test material transversely to the direction of travel. Additional transducers emit radiation perpendicularly through the test material. Accordingly, the test material is fully probed and many different kinds of defects can be detected. The transducers are positioned away from the test material by a distance which is substantially the near field distance of the ultrasonic beam. Means are provided for adjusting the spacing between two wheels to allow different thicknesses of test material to he tested by interwheel transmission of the ultrasonic beam.

U.S. Pat. No. 5,522,265 titled "Travelling Ultrasound Fault Detector for Railway Line Internal Faults", describes sprung loaded sensors and the water system for keeping the sensor heads and the rail coupled with a film of water. The improved version described with reference to FIGS. 4 and 5 thereof, supplies water at a pressure of between 10 and 15 bars.

When examining railway rails, if water is used as the coupling fluid, the large quantity of water consumed as the sled is pulled over the rails has to be carried on board the train, and this affects the ability of the system to inspect rails over long distances with high reliability. In such systems ultrasonic probes are mounted on a wagon that travels along the rail and large quantities of water are required to couple the probe with the rail to transit the ultrasonic signal and its reflection. The locomotive that pulls the wagon with the ultrasonic probes has to pull a water tank with a large quantity of water. Such a system is wasteful of water which may be in short supply. Additionally, flooding the area near tracks encourages weeds to grow. Furthermore, pulling a large quantity of water is work performed by the locomotive and is expensive and wasteful of fuel. Finally, such water tanks need to he refilled as the water runs out which requires a water tower or pumping system to refill the tanks, and results in regular downtime of the system whilst water in the tanks are replenished. The water used up in this manner is not available for further use and thus there is both an economical and an ecological cost.

U.S. Pat. No. 5,804,731 to Jaeggi titled "Ultrasonic device for Measuring the Internal Defects of a Rail" describes a continuous web of acoustic conducting material that surrounds the ultrasonic sensor array like a caterpillar track and protects them from wear.

FR 2635066 to SNCF also describes a system that appears to avoid using water as a coupling fluid between the sensor and track.

Some systems such as one marketed by Tvema, have a 'shoe' consisting of an ultrasonic conducting polymer, typically a polycarbonate, beneath the ultrasonic sensor that couples the sensor to the track. The sensor unit with the polymer shoe is sprung loaded by a spring that forces the polycarbonate against the track, thereby maintaining contact and conducting the ultrasonic signal and its reflection. Polycarbonate is a tough material, nevertheless as it is pressed against and dragged over a rail, it is slowly worn away.

Scanmaster has developed and patented technology for mapping flaws in work pieces using ultrasound. See for example, U.S. Pat. No. 6,070,466 to Taran et al. V, titled "Device for Ultrasonic Inspection of a Multi-Layer Metal Workpiece."

PCT/IL2016/05065 to Scanmaster titled "Improved Rail Testing System" describes a system that uses much less fluid than traditional systems and recirculates the water, spraying water onto the rail in front of the probes and sucking up water from the rail beyond the probes. Unlike the early systems where the probes essentially float in a large stream of high pressure water, the probes described in PCT/IL2016/05065 to Scanmaster are also sprung mounted to keep them in contract with the rail, which allows them to retract if debris is present on the rail. The water film provides not only good ultrasonic contact but also provides lubrication between the polycarbonate shoes and the track and so the amount of wear on the shoes is less than with dry ultrasonic probe systems. Nevertheless, such systems suffer from wear. The polycarbonate shoes, when new are typically about 5 mm thick and typically require replacement every 50 to 70 Km depending on the line condition. This requires stopping the test and manual replacement followed by calibration, with the total downtime being typically an hour.

SUMMARY OF INVENTION

Aspects of the present invention are directed to ultrasonic inspection systems for rails that use minimal water for coupling the ultrasonic probe to the railway track but are nevertheless low wear systems that do not require frequent replacement of the shoe between the ultrasonic transducers and rail thereby minimizing downtime and maintenance.

A first aspect is directed to an ultrasonic probe for non-destructive testing of a rail, said probe comprising
a housing;
an insert comprising an ultrasonic transducer and a polycarbonate shoe having a face for contacting a rail;
and a compressed spring for exerting a downward force on said insert;
the insert being configured such that an upward force on the face of the polycarbonate shoe greater than the downward force exerted by the compressed spring forces the insert up into the housing,
the system further comprising
A restraining plate comprising a flange around an aperture that covers part of the sled thereby preventing the polycarbonate shoe from extending more than a preset fixed amount beyond the aperture through the sled, despite the downward force on the inset.

Preferably the polycarbonate shoe is several millimeters thick and the preset amount is less than 1 mm.

Preferably the ultrasonic probe is part of a system that further comprises a water reservoir for providing a film of water between said face of the shoe and a surface of the rail being inspected.

Most preferably the system further comprises a suction system for sucking water from the rail after the probe to recycle said water back to said reservoir.

BRIEF DESCRIPTION OF FIGURES

For a better understanding of the invention and to show how it may be carried into effect, reference will now be made, purely by way of example, to the accompanying Figures, wherewith it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

In the drawings, like components are generally designated by like reference numerals, wherein.

DESCRIPTION OF EMBODIMENTS

Ultrasonic testing transducers in sled type systems are protected with a special solid material also called a "shoe"

to protect the transducer from any damage that might be caused by hard debris such as stones and the like on the rail surface. The show is made of a polymer that is partially transparent to ultrasonic signals. It does, however, attenuate the signal somewhat.

In the Scanmaster system described in PCT/IL2016/05065 titled "Improved Rail Testing System" incorporated herein by reference, the ultrasonic probe comprises an ultrasonic transducer and a protective shoe made of a polycarbonate that has a high ultrasonic transmissivity. The probe is mounted within a housing and a compressed spring, typically a helical spring forces the probe against the rail. An opposing pressure beyond that of the spring forces the probe into the housing, so the probe is retracted as it traverses debris on the rail and the like.

Such shoes have very high wear rare due to constant contact with the rail surface during testing and require frequent replacement. As a standard maintenance procedure, the protecting shoe is typically replaced every 50-70 km depends on the line condition. When monitoring older lines with a lot of corrosion or tracks in sandy areas, the surface wear on the show is even higher and replacement is required more frequently. The frequent replacement of the polycarbonate shoe is costly. This is not only due to the inherent cost of the material, but also since the testing has to be stopped whilst the shoes are replaced, so the overall costs include labor and downtime which is typically about an hour, since recalibration is required.

Figure 1:
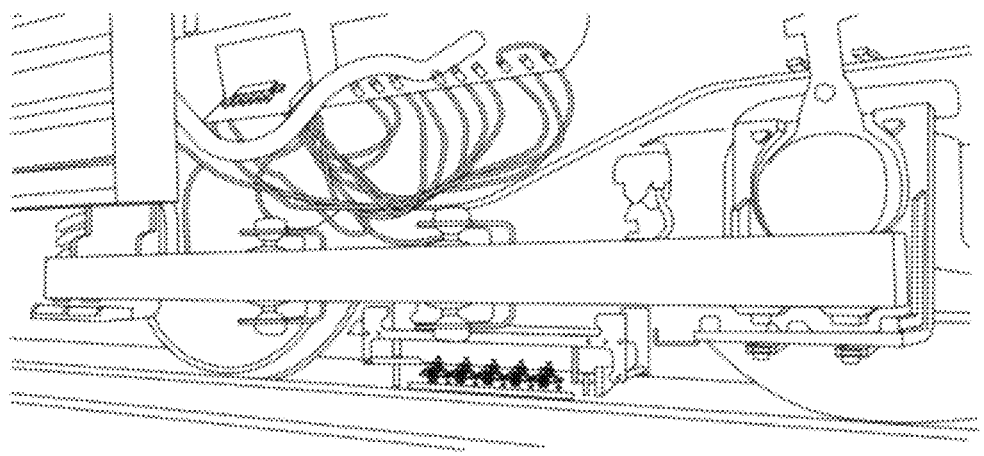
FIG. 1 is a photograph of a Scamnaster sled attached to the axles of a pair of bogey wheels of a wagon.

With reference to FIG. 1 a photograph of Scanmaster's prior art sledge attached to a pair of axles of a wagon is shown. The sledge is configured to slide along the rail.

Figure 2:
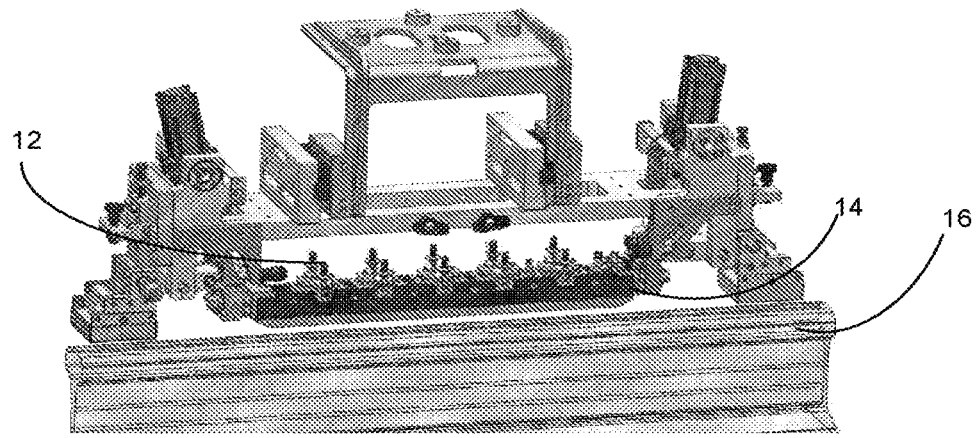
FIG. 2 is a schematic isometric view sled over a rail, showing an array of ultrasonic probes positioned over the rail, with magnetic alignment means upstream and downstream of the array for holding the sled over the rail in correct alignment therewith.

Referring to FIG. 2, a schematic illustration of the prior art sled is shown. Prior art sled consists of an array of ultrasonic probes suspended above a rail, and a magnetic alignment means for keeping the sled aligned with a rail. In this instance, the array is linear.

Figure 3:
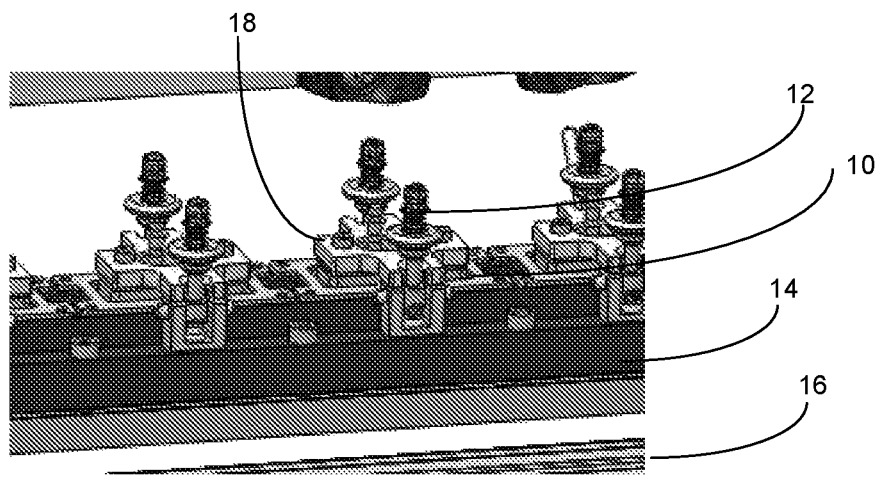
FIG. 3 is a schematic close-up view of a section of the sled showing a probe in a socket, a spring for forcing the probe down into the socket, and a plate with flange that prevents the probe from being forced downwards more than a present amount.

Referring to FIG. 3, each ultrasonic probe 10 sits in a slot within the sled 14 and sprung loaded springs 12 enable the probe to retract if it goes over stones and other debris on the track 16. A flange 18 with an aperture provides as a cap over the transducer slot. The flange 18 is bolted down by spring bolts 12 that enable the probe 10 and flange 18 to rise up in the sled if a force is applied to the face of the probe, such as if the probe is dragged over stones or other debris.

Figure 4A:
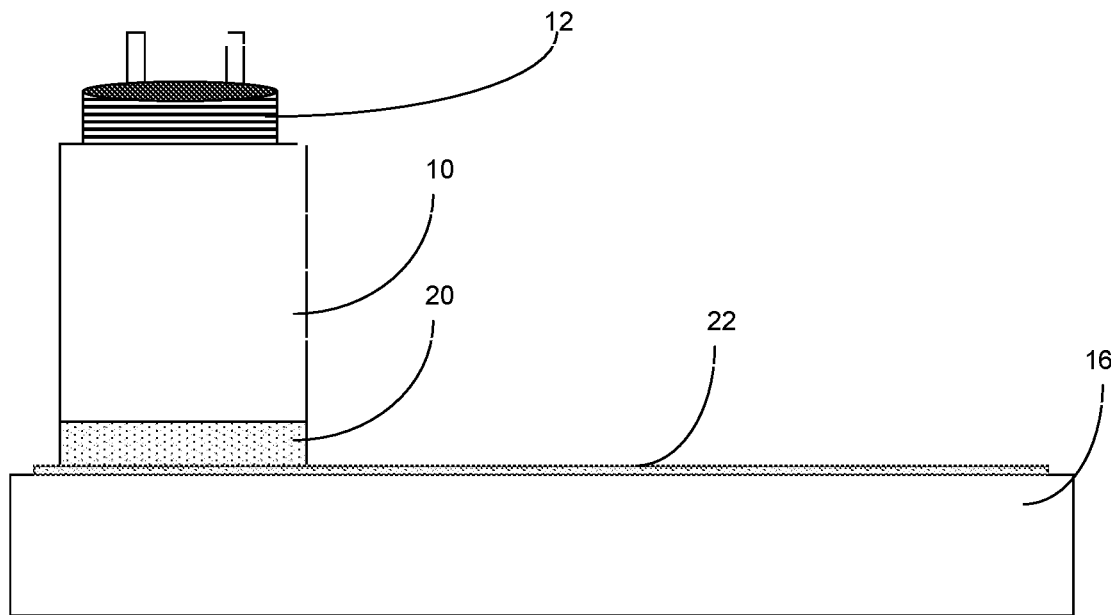
FIG. 4a shows a prior art probe with a polycarbonate shoe in contact with a rail.
Figure 4B:
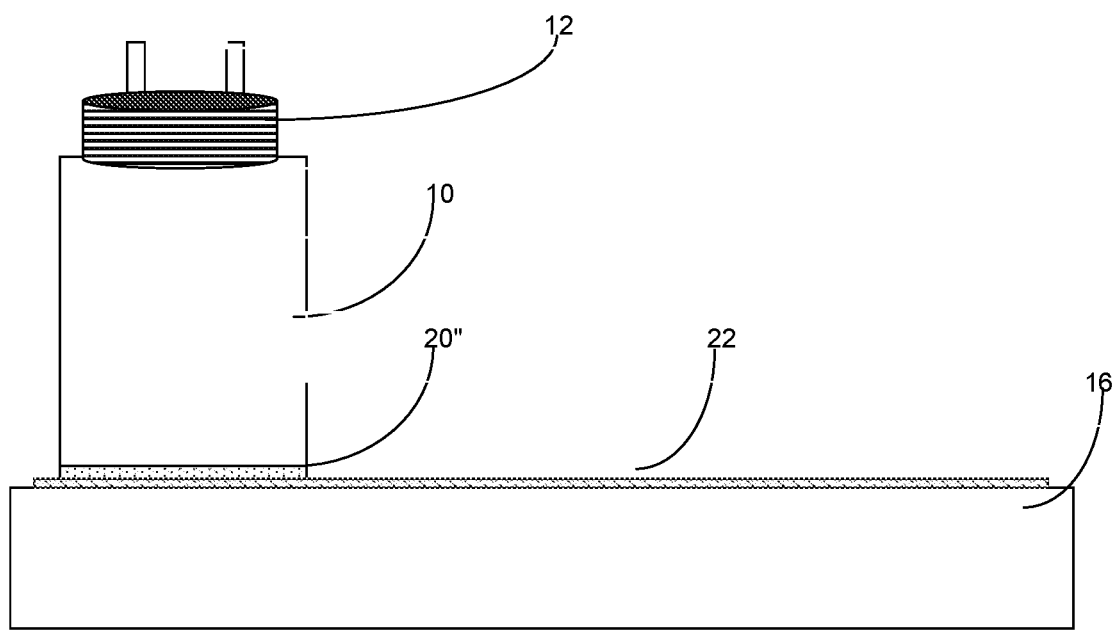
FIG. 4b shoes the prior art probe of FIG. 4a with the polycarbonate shoe largely worn away.

FIGS. 4a and 4b show the prior art ultrasonic probe 10 coupled to the rail 16 by the polycarbonate shoe 20 and a film of water 22 that both provides good ultrasonic contact and lubricates the face of the polycarbonate shoe 20, to some extend reducing wear thereof.

As shown schematically in FIG. 4a, in the prior art, a polycarbonate shoe 20 is forced against the track 16 by the helical spring 12 of the spring bolts. The contact of the shoe 20 with the track 16 causes the polycarbonate face 20 of the shoe to be worn away. To some extent, flooding the track with water 22 reduces the wear and maintains good ultrasonic transmission.

Nevertheless, a shown in FIG. 4b, the polycarbonate shoe 20" is worn away and needs periodic replacement. Such shoes have very high wear rare due to constant contact with the rail surface during testing and require frequent replacement. Thus, typically, as a standard maintenance procedure, the protecting shoe of the system described in PCT/IL2016/05065 titled "Improved Rail Testing System" is typically replaced every 50-70 km.

Figure 5:
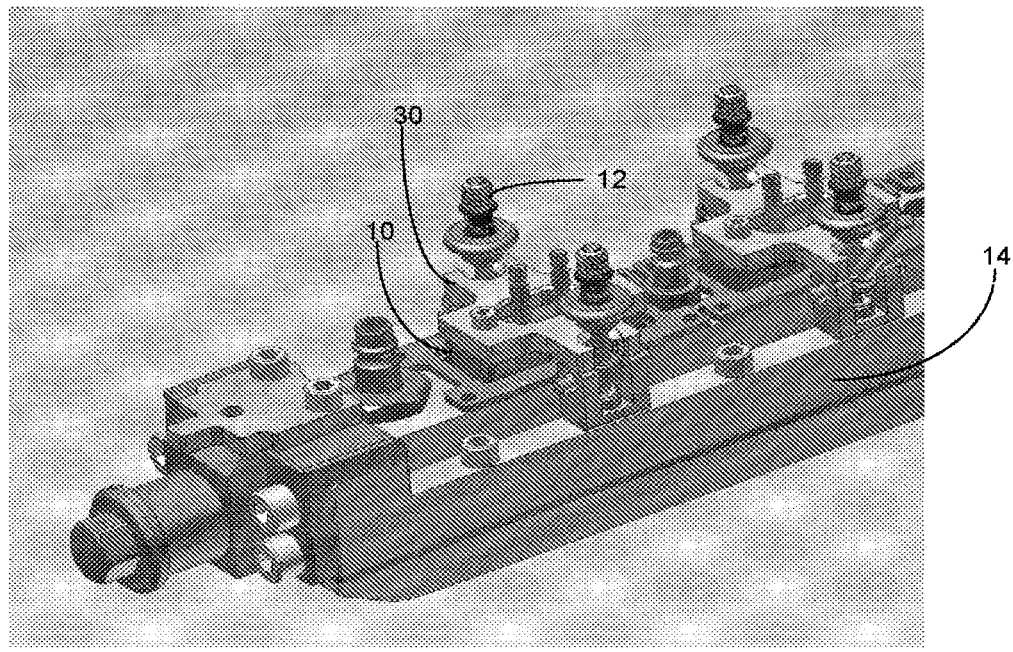
FIG. 5 shows a modification of the mounting of the probe that includes a cover plate with flange, that enables the probe to be raises against helical springs if debris on the rail is encountered, but which prevents the springs forcing the probe against the track once a preset amount of wear has occurred.

With reference to FIG. 5, the mounting of the probe 10 within the sled 14 by the spring loaded bolts 12 is achieved by means of a plate 30 to which the probe 10 is bolted. Plate 30, which is shown in greater detail in FIG. 6, is restrained by the spring loaded bolts 12 such that the probe 10 and plate 30 may be moved upwards by a force on the shoe of the probe.

Figure 6:
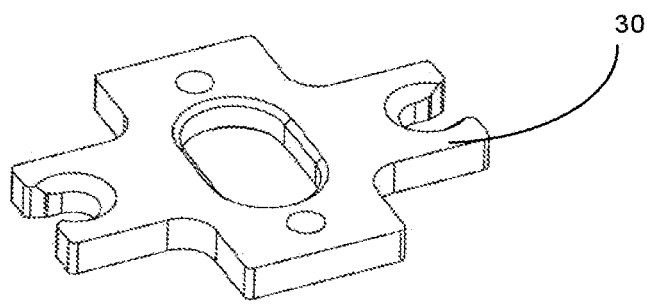
FIG. 6 is an enlarged isometric projection of a previously used plate.
Figure 7:
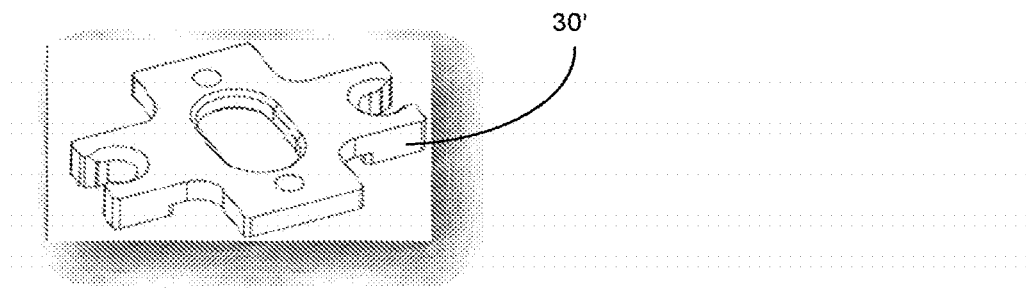
FIG. 7 is an enlarged isometric projection of a novel plate disclosed herein.

To prevent the show from being totally removed, a modified plate 30' as shown in FIG. 7 was substituted for the plate 30 of FIG. 6.

In modified plate 30', the flange to which is bolted to the sled 14 with the spring loaded bolts 12 protrudes below the socket for the probe 10. This prevents a preset thickness of the shoe 20, typically 2-3 mm, from being worn away.

Consequently, after about 0.5 mm to 1 mm of the face of the shoe is worn away and conformed to the surface of the track, the flanges of the plate 30' restrains the probe 10 and prevents the shoe 20 from being forced further out of the housing.

Consequently an equilibrium is reached wherein the face of the shoe 20 is worn away to conform to the profile of the track 16 and contact with the track is maintained by a thin film of water 20 from the water system that sprays water on the track upstream of the probe and sucks excess water off the track downstream of the probe. The polycarbonate or similar shoe 20 and the thin film of water 11 provides a medium for ultrasonic contact that allows transmission of the ultrasonic signals from the probe 10 to the rail 16 and reflected back from the rail 16 and flaws therein to the probe 10. The water 22 also lubricates and minimizes further wear.

Figure 8:
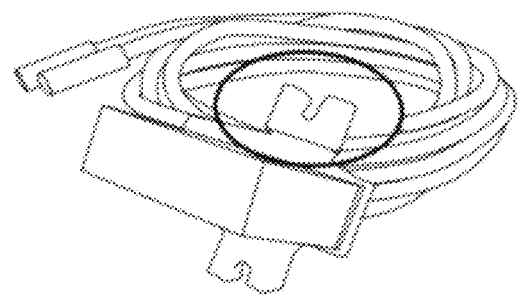
FIG. 8 shows a probe, plate and mounting cables in the laboratory.
Figure 9:
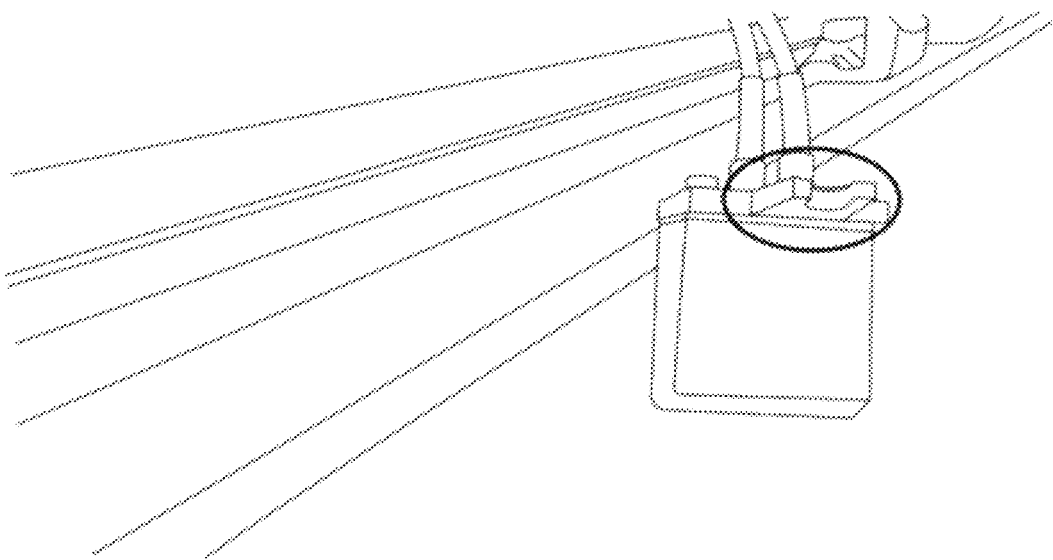
FIG. 9 shows the probe, plate and ends of cables disconnected from the sled (not shown) and suspended by the cables above the gravel surrounding a rail.

FIG. 8 shows a photograph of the modified probe in the laboratory, and FIG. 9 shows the probe in the field, by a rail during testing in Spain during December 2016 where it was surprisingly found that modified probe design including the plate of FIG. 7 resulted in the probe shoes requiring replacement only twice in 5 days of testing during which 1500 km of track was monitored. Thus the number of shoe replacements was one tenth that previously required modified probe design was able to travel ten times the distance between shoe replacements than was previously possible. This saves on shoes, but also on downtime and maintenance costs.

Persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. An ultrasonic probe for non-destructive testing of a rail, said probe comprising
   a housing;
   an insert comprising an ultrasonic transducer and a shoe having a face for contacting a rail;
   a compressed spring for exerting a downward force on said insert, assembled on top of an external side of said insert; and
   a flange with an aperture provided as a cap over a slot in said insert for said ultrasonic transducer, assembled between said insert and a sled of the rail;
   wherein the flange is bolted down by said spring, thereby preventing the shoe from extending more than a preset fixed amount through the aperture.

2. The ultrasonic probe of claim 1, wherein the shoe is a polycarbonate shoe having a thickness of several millimeters and the preset amount is less than 1 mm.

3. A system for ultrasonic inspection of a railway track comprising the ultrasonic probe of claim 1 and further comprising a water reservoir for providing a film of water between said face of the shoe and a surface of the rail being inspected.

4. The system of claim 3 further comprising a suction system for sucking water from the rail after the probe to recycle said water back to said reservoir.

5. The system of claim 1, wherein said flange is bolted down by said spring bolts to enable the probe and the flange to rise up in the sled if a force is applied to the face of the probe.

\* \* \* \* \*